United States Patent [19]

Frahm

[11] Patent Number: 4,968,179

[45] Date of Patent: Nov. 6, 1990

[54] SECONDARY CONTAINMENT SYSTEM FOR HAZARDOUS FLUID CONVEYANCE AND DELIVERY SYSTEMS

[76] Inventor: Bradley K. Frahm, 5456 Covey Creek Cir., Stockton, Calif. 95207

[21] Appl. No.: 306,956

[22] Filed: Feb. 7, 1989

[51] Int. Cl.$^5$ .............................................. F16L 1/00
[52] U.S. Cl. ...................................... 405/53; 405/52; 405/128
[58] Field of Search ................... 405/128, 129, 52, 53, 405/270; 73/40.5 R; 137/312, 313; 222/23, 52

[56] References Cited

U.S. PATENT DOCUMENTS

| | | | |
|---|---|---|---|
| 4,352,601 | 10/1982 | Valiga et al. | 405/128 X |
| 4,450,711 | 5/1984 | Claude | 73/40.5 R |
| 4,653,958 | 3/1987 | Anderson et al. | 405/157 |
| 4,673,926 | 6/1987 | Gorman | 73/40.5 R X |
| 4,682,492 | 7/1987 | Green | 73/40.5 R X |
| 4,778,310 | 10/1988 | Moreland | 405/270 |
| 4,787,772 | 11/1988 | Wagner | 405/53 |

*Primary Examiner*—Dennis L. Taylor
*Attorney, Agent, or Firm*—Lothrop & West

[57] ABSTRACT

A secondary containment system for hazardous fluid conveyance and delivery systems. A plurality of rigid pipe envelope units is serially assembled to provide total containment for fluid pipes and associated pumping and fluid utilization components. Each pipe envelope unit has a containment shell and a mating upper cover. The containment shells are characterized by a concave surface portion, defined in transverse cross section by a substantially continuous curve. Each containment shell further has an upwardly facing, open top, extending the length of the shell and spanning the area between the upper ends of the concave surface. The upper cover for each envelope unit is coextensive with the open top of the shell, and is attached to respective upper ends of the concave surface, forming a fluid impervious seal between the mating surfaces. The pipe envelope units assume a variety of configurations to conform to the path of the fluid pipe. A leak sensor housing and special housings for components of the primary fluid system are also disclosed.

10 Claims, 3 Drawing Sheets

SECONDARY CONTAINMENT SYSTEM FOR HAZARDOUS FLUID CONVEYANCE AND DELIVERY SYSTEMS

CROSS-REFERENCES TO RELATED APPLICATIONS

Ser. No. 07/140,832, filed Jan. 4, 1988, for Turbine Pump Chamber;

Ser. No. 07/140,835, filed Jan. 4, 1988, for Leak Sensor Housing; now U.S. Pat. No. Des. 307,557.

Ser. No. 07/159,025, filed Feb. 22, 1988, for Fluid Containment Trough For Gasoline Pump, Or The Like.

BACKGROUND OF THE INVENTION

1. Field of the Invention

The invention relates generally to apparatus for containing leaks that may develop within a conveyance and delivery system for hazardous and toxic fluids, such as petrochemicals and industrial chemicals. More particularly, the invention pertains to secondary containment systems providing leak detection and total containment for leaks occurring in a pumping station, piping system, or at a dispensing station, for hazardous fluids.

2. The Prior Art

Secondary containment systems for certain hazardous fluid storage, conveyance, and delivery systems have been mandated by governmental agencies in recent years. As a consequence of these regulations, a number of different containment systems have been proposed. The earliest regulations pertained solely to the tanks and containers used to store the fluids. These tanks were typically, but not always, located underground. Double wall tanks and flexible membrane liners for the tank pit were developed to contain leaks which might occur in the primary wall of fluid storage tanks.

Later regulations required secondary containment of the components for conveying and delivering the hazardous fluids from the storage tank to a utilization site. These components may include a pump, adjacent the storage tank, a remote delivery or dispensing station, and a piping system interconnecting the two.

A first construction for secondarily containing these components employs sections of preformed trench liners, connected end to end and laid within an excavated pipe trench. Typical of such trench liner systems is the arrangement shown in U.S. Pat. No. 4,653,958, issued to Anderson et al. In Anderson's containment system, the transverse cross-sectional configuration of each fiberglass trench liner section closely resembles the shape of the pipe trench within which it lies, having a planar bottom wall, or floor, and vertically upstanding side walls. Also disclosed in the Anderson patent are a turbine pump enclosure, a dispenser station catchment pan, a leak sensor, and connector sections, such as elbows, Tees, and the like.

In Moreland, U.S. Pat. No. 4,682,911, a flexible membrane containment system is taught. Moreland's membrane material is designed to be placed within existing fluid storage tank pits, as well as to line and generally conform to the configuration of the pipe trenches which radiate from the pit area. A membrane-lined drip pan, underlying a fluid dispensing station, is also disclosed. Moreland shows the placement of leak monitor stations at low points in the system where fluids may collect. Moreland further uses curved and intersecting sections of membrane material to join straight lengths of the flexible trench liner membrane. The various membrane sections which form the total containment system are connected together by means of plastic zippers.

A third class of secondary containment systems employs double wall piping to confine leaks only occurring within the pipe system. This "pipe within a pipe" construction may use conventional pipe fittings, such as Tees, crosses, elbows, or other angled connectors or fittings, in combination with straight or linear runs of the secondary containment pipe. Another variant of this double wall system utilizes special two-piece fittings at the angled or intersecting connection points in the containment piping. These clamshell-like fittings facilitate assembly of the inner product piping in combination with the outer containment piping. Representative of this latter construction is RED THREAD II, manufactured by A. O. Smith Fiberglass Products, Inc., of Little Rock, Ark.

SUMMARY OF THE INVENTION

In its most basic configuration, the secondary containment system of the present invention utilizes a plurality of rigid pipe envelope units, serially assembled to provide total containment for a run of fluid distribution pipe extending from a fluid source to a fluid outlet. Each pipe envelope unit has a containment shell and a mating upper cover.

Each containment shell includes a concave surface portion, defined in transverse cross section by a substantially continuous curve. The containment shell also has an upwardly facing, open top, extending the length of the shell and spanning the distance between upper ends of the concave surface. The upper cover for each envelope unit is coextensive with the open top of the shell, and is attached to respective upper ends of the concave surface, forming a fluid impervious seal between the adjacent mating surfaces.

The pipe envelope units assume a variety of overall configurations, generally conforming to the path taken by the contained fluid distribution pipe. Thus, there are, for example, straight or linear units, elbow units, 45 degree units, cross, and Tee units. At the fluid source and fluid outlet locations, the secondary containment construction may be adapted only to seal with the fluid distribution pipe as it enters and exits the system, providing total containment solely for the enclosed run of pipe. In the alternative, special component envelope units, or housings are provided at the source and outlet locations to contain the pipe terminations and various interconnecting components.

In a particular application for the invention herein, a total secondary containment system for a petrochemical storage and dispensing station is disclosed. Known means, such as double wall tanks, or pit liner membrane can be used to contain leaks which may occur in storage tanks for the petrochemical fluids. The remainder of the secondary containment system is provided by applicant's pump and pipe envelope units.

This particular application of the invention contemplates that one end of an assembly of pipe envelope units is interconnected and hydraulically sealed to an outlet in a pump envelope unit or housing, overlying the storage tank. The other end of the envelope assembly terminates immediately beneath a fluid dispensing station. Fluid impervious joints are also provided between adjacent envelope units, where respective containment shells and covers mate. Total containment for all components of the fluid pumping and fluid distribution systems is thereby provided.

The total containment feature ensures that if a leak occurs within these components, the hazardous or toxic fluid will be confined solely to the secondary system, rather than polluting the adjacent soil or underlying aquifers. And, in geographical regions having a high water table, this same feature prevents unwanted water from entering the secondary containment system.

The assembled envelope units are preferably inclined downwardly to a lowermost pipe envelope unit or to an adjacent component envelope unit, enclosing a fluid leak sensor. If a leak occurs, the downwardly curving surface of the containment shell directs the fluid to the central, lowermost portion of the shell. From there, the fluid travels down a direct and confined path until it reaches the fluid leak sensor. In this manner, the leak is quickly detected, and the fluid pump can be shut down with a minimal amount of fluid having escaped from the fluid distribution pipe.

While the detailed description contained herein pertains specifically to an underground application of the invention, the invention may also be used advantageously for above-ground secondary containment applications.

DETAILED DESCRIPTION OF THE PREFERRED EMBODIMENT

Figure 1:
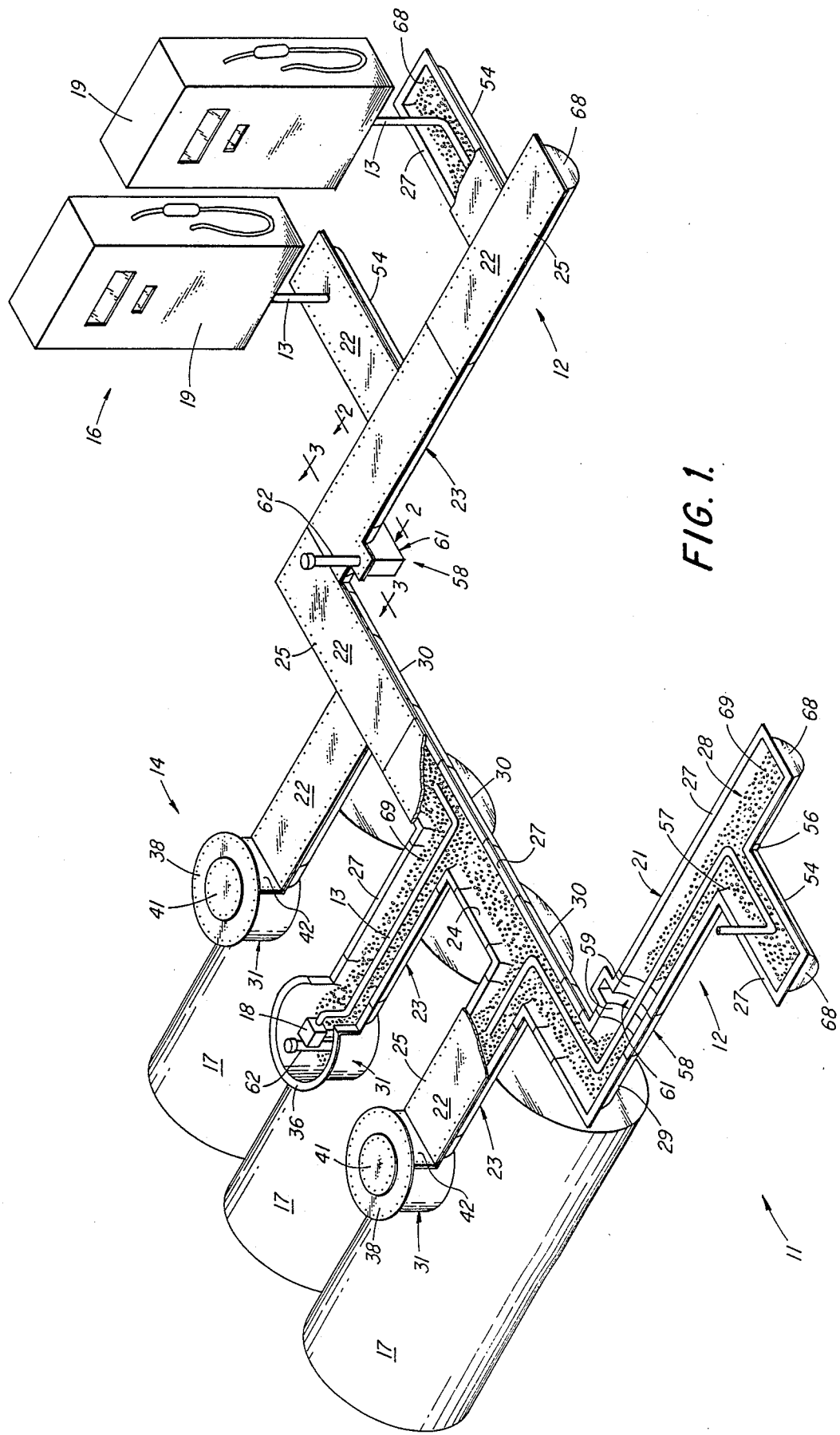
FIG. 1 is a perspective view of the present secondary containment apparatus, shown in conjunction with a representative petrochemical storage, pumping, distribution, and dispensing system.

The secondary containment system 11 includes a plurality of serially connected pipe envelope units 12, assembled to surround and totally enclose a run of at least one fluid distribution pipe 13. A fluid source, generally designated 14, is provided at one end of the pipe run, and a fluid outlet 16 is provided at the other end. In the case of the representative application of the invention, disclosed in detail herein, the fluid source 14 would typically include a fluid storage tank 17 having a secondary containment construction well known in the art, such as double walls. Mounted atop the tank 17 is a turbine pump 18, adapted to provide fluid on demand to the interconnected distribution pipe 13.

The fluid outlet 16 may be configured as a dispensing station 19, having a conventional delivery hose and nozzle, as well as appropriate flow metering apparatus, not shown. Other fluid outlet devices are also contemplated herein, such as a permanently located engine, generator, or other fluid utilization machines.

Each pipe envelope unit 12 includes a rigid containment shell 21 and a mating upper lid or cover 22. Taking for example, a linear or straight envelope unit 23, the containment shell 21 has an elongated concave surface portion 24, characterized in transverse cross section by a substantially continuous curve. This curve may assume a variety of semi-circular, elliptical or other continuous curvilinear configurations; but, so long as the resultant surface is continuously curving in nature, the benefits of the invention will be afforded. The surface portion 24 further has upper ends 26, provided with respective outwardly directed flanges 27, running the entire length of the containment shell. The shell is preferably constructed from a fiberglass material, structurally rigid, impervious to leakage, and resistant to degradation if exposed to the contained fluid. Special resins, particularly resistant to fire, acids, or alkaline compositions, may also be used in the fiberglass manufacture.

The shell 21 is further characterized by an upwardly facing open top 28, extending the length of the shell and spanning the distance between the upper ends 26. The upper cover 22 is generally coextensive with the open top 28, and is attached to the shell along the flanges 27, by means of a bead of sealant and screws 25. A fluid impervious seal is thereby formed between the shell 21 and the cover 22, providing a total containment envelope for the pipe 13. However, the cover is readily removed when needed, providing easy access when entering the containment system for leak repair, restoration, or modifications to the piping or containment system. The cover is also preferably manufactured from a rigid fiberglass material, resistant to the contained fluid.

Pipe envelope units 12 are provided in a variety of configurations, to enable the containment system to follow whatever paths are taken by the fluid distribution pipes. For example, in addition to the linear units already described, the system also employs elbow, 45 degree, Tee, and cross envelope units. As pipe runs may also undergo significant and abrupt vertical transitions, special 45 and 90 degree envelope units configured to direct the containment envelope through vertical transitions are also included within the present containment system.

The particular system shown in FIG. 1 includes a pair of elbow, or 90 degree envelope units 29, adapted to effect a right angle transformation of the containment envelope. The unit 29 and the other envelope transforming units identified above, have a concave surface portion, defined in transverse cross section by a substantially continuous curve, as previously described for linear envelope units 23. Each of these envelope units further has flanges 27 on the upper ends of its concave portion 24, to accommodate a respective upper cover 22.

Similarly, the system of FIG. 1 includes three Tee envelope units 30, each having a concave surface portion 24, flanges 27, and a cover 22 constructed in a manner consistent with the pipe envelope units described above.

Figure 5:
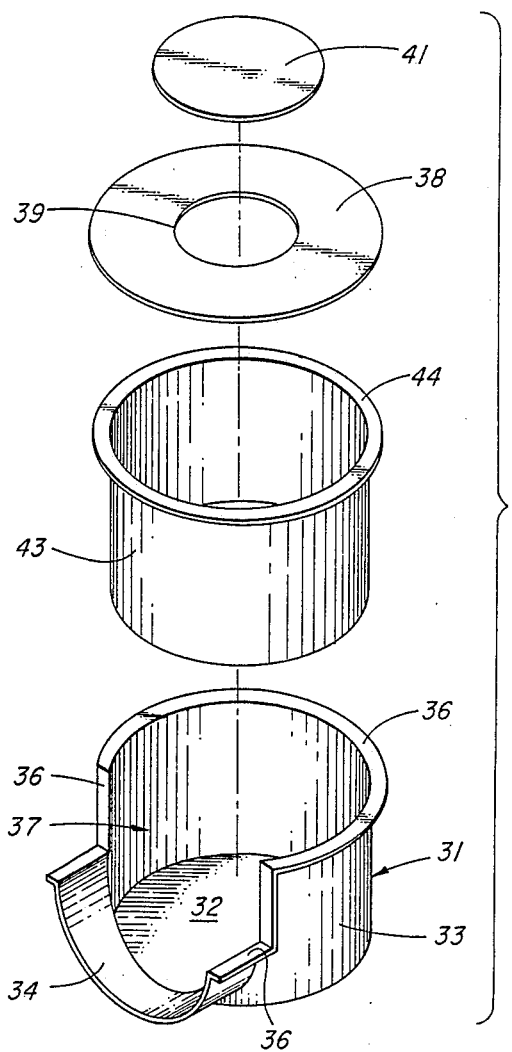
FIG. 5 is an exploded perspective view of an alternative construction for the pump housing; and, FIG. 6 is a perspective view of the construction in FIG. 5, shown assembled in conjunction with a fragmentary section of a pipe envelope unit.

Special envelope units may also be provided at the fluid source 14 and fluid outlet 16 locations within the system. One of these special envelope units is the turbine pump housing 31, generally right-circular cylindrical in configuration. Making particular reference to FIG. 5, housing 31 includes a circular floor 32, and a peripheral cylindrical wall 33 upstanding therefrom. Housing 31 includes at least one outlet, conveniently provided in the wall 3 and particularly adapted to interface with an outgoing pipe envelope unit 12 by means of an arcuate lip 34. Housing 31 is also provided with a peripheral flange 36, extending around the upper edge of wall 33, the edges of the vertical cutout 37 provided in the wall 33, and the upper edges of the lip 34.

In the standard petrochemical storage and dispensing station shown in FIG. 1, floor 32 of the turbine pump housing is mounted directly over an outlet port in the storage tank 17. An aperture is provided in the floor 32 for the passage of a feed pipe from the tank to the inlet of the pump. Sealing means, such as a gasket or fluid resistant sealant, is provided between the aperture and the feed pipe, for containment of any fluids collecting on the floor of the housing. Distribution pipe 13 connects directly to the pump's discharge port, for delivery of fluid under pressure through the distribution system.

As storage tanks 17 are typically installed underground, access must be provided to the turbine pumps for maintenance and repair. If the tanks are not installed too deeply underground, a housing cover 38, having a circular access hole 39, is mounted upon the underlying flange 36, and a circular cover plate 41 is removably affixed to the cover 38. A rectangular in elevation, side plate 42 is attached across opposing sections of peripheral flange 36, along vertical cutout 37. The excess segment piece of cover 38, extending outwardly from plate 42, is simply cut off, and a fluid tight seal is formed between their adjacent edges by applying a strip of fiberglass and bonding resin.

Figure 6:
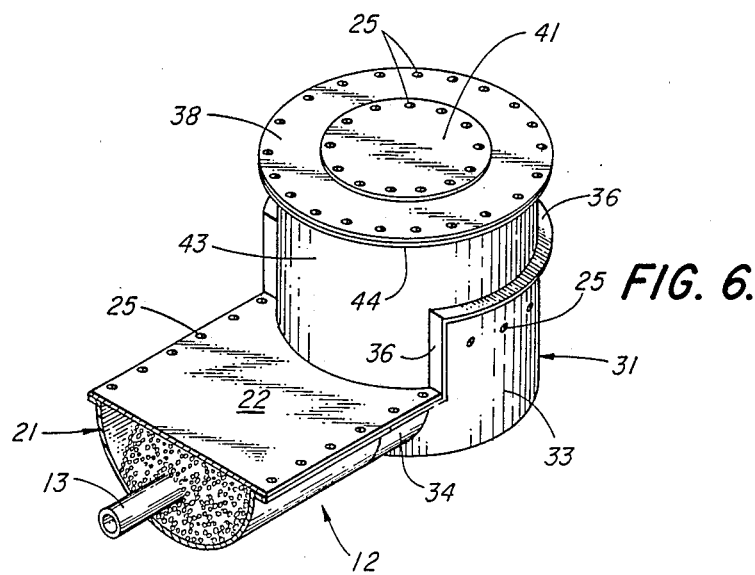

However, if the tops of the tanks are located five or six feet below grade, an extension sleeve 43 is provided, to relocate the cover at a more convenient level. Sleeve 43 is right-circular cylindrical in configuration, and is provided with an annular flange 44 around the periphery of its upper edge. The outer diameter of sleeve 43 is such that it slidably engages the inner side of wall 33, and is capable of forming a satisfactory fluid impervious seal therewith through the use of sealant. After the sleeve has been adjusted to place the cover 38 at an appropriate height, screws, rivets, or other fasteners 25 are used to secure the housing and the sleeve together. In this construction, shown most clearly in FIGS. 5 and 6, the outer sidewall of the sleeve eliminates the need for the previously discussed side plate 42.

After the storage tanks and turbines have been installed, trenches are dug to accommodate the distribution pipes 13 and the pipe envelope units 12. The trenches have a generally horizontal, planar floor 46 and vertical side walls 47. The trenches are graded gradually downwardly, from the dispensing stations 19 to the top of a lowermost storage tank 17.

Figure 4:
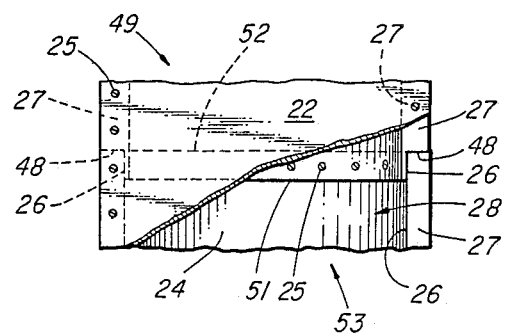
FIG. 4 is a top plan view of a joint interconnecting two adjacent pipe envelope units.

In the next step, the pipe containment shells 21 are serially assembled within the excavated trenches, following the course of the excavation. Fluid impervious joints are formed between adjacent units by the construction shown in FIG. 4. Initially, a pair of notches 48 is formed by removing a small section of the flanges 27 on one end of a first envelope unit 49. A lower end 51 of the first unit, is slid into engagement with an upper end 52 of a second envelope unit 53, so that a portion of the lower end 51 overlaps a portion of the upper end 52. Sealant is used between the overlapping portions to ensure a fluid tight seal, and screws 25 provide a mechanical bond between the joined containment shells. A strip of fiberglass material, not shown in FIG. 4, may be bonded over the lap joint as an extra measure.

Not all intersections between pipe envelope units 12 necessarily require the use of a Tee envelope unit 30, described above. As shown in FIG. 1, a short envelope unit 54, extending immediately beneath the dispensing station, may be joined directly to an adjacent unit 23. A flange 56, evident on one end of the open unit 54 shown in FIG. 1, is provided to establish a strong bonding structure. An arcuate cutout 57 is made in the surface portion 24 of the unit 23, and the flanged end is laid against the unit 23 abutting the periphery of the cutout. The conventional bonding methods discussed above are used to complete the union.

A special pipe envelope unit in the form of a leak detector sensor housing 58 is also included for this application of the secondary containment system. As shown in FIG. 1, a housing 58 is provided at the location where each run of linear envelope units 23 meets a respective elbow envelope unit 29.

Each housing 58 includes a pair of concave surfaced connecting stubs 59 straddling an intermediate fluid collection pan or trough 61. The stubs 59 are virtually identical in transverse cross sectional size and configuration to adjacent surface portions 24 of the containment shells 21, enabling them to be interconnected so as to form a mechanical union and a fluid impervious seal therebetween, as described previously. Flanges 27 are also included on the upper portions of the stubs and the collection trough to mate with the cover 22.

An inspection and sensor tube 62 extends from the lowermost portion of the collection trough to a service box 63, at grade level. A fluid sensor 64, adapted to detect the presence of any leaking fluid, is located at the bottom of tube 62. Wire 66 passes through the tube 62, to interconnect the sensor 64 and a connection terminal 67. Aural and visual alarm devices, not shown, are typically wired to the terminal 67, to alert personnel of the occurrence of a leak. The tube 62 also allows direct visual inspection of the bottom of the collection trough, in the event that such an inspection becomes necessary.

It is also desirable to install an inspection and sensor tube 62 and the associated fluid sensor components within the turbine pump housing 31 overlying the lowermost tank 17. As the fluid sensor adjacent the bottom of this third inspection tube is located at the lowermost point in the secondary containment system, it serves to detect both pump and pipe leaks.

To complete this first phase of assembling the containment system, end plugs 68 are provided for those containment shells having vacant ends. A sealing, fluid tight bond is made between the plugs 68 and the respective surface portion 24.

At this point in the construction, the containment shells are fully assembled within the trenches, extending from the fluid source 14 to the fluid outlet 16. Making specific reference to FIG. 6, a representative interconnection between a containment shell 21 and a turbine pump housing 31 is shown. At the fluid outlet end of the containment system illustrated in FIG. 1, the distribution pipe 13 merely exits through the cover 22 and interconnects to the fluid dispensing station 19.

However, for particular applications, yet another special envelope unit may be provided, to afford an extension of the total containment system to any piping and apparatus existing at the fluid outlet. For example, if a stationary engine were located at the fluid outlet, a component containment housing, similar in construction and function to the turbine pump housing 31, could be added to enclose this engine, thereby affording total containment for the entire fluid storage, distribution, and utilization system.

Figure 2:
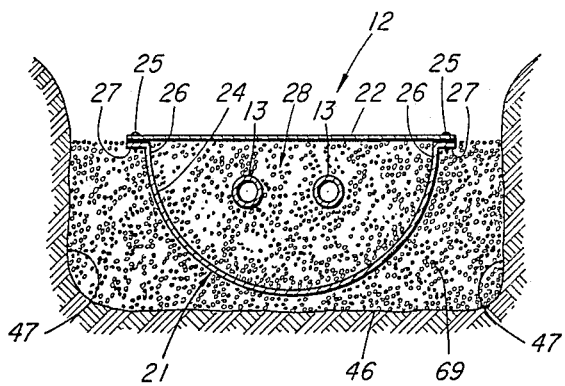
FIG. 2 is a transverse, cross-sectional view of a linear portion of a pipe envelope unit, taken along the line 2—2 in FIG. 1.
Figure 3:
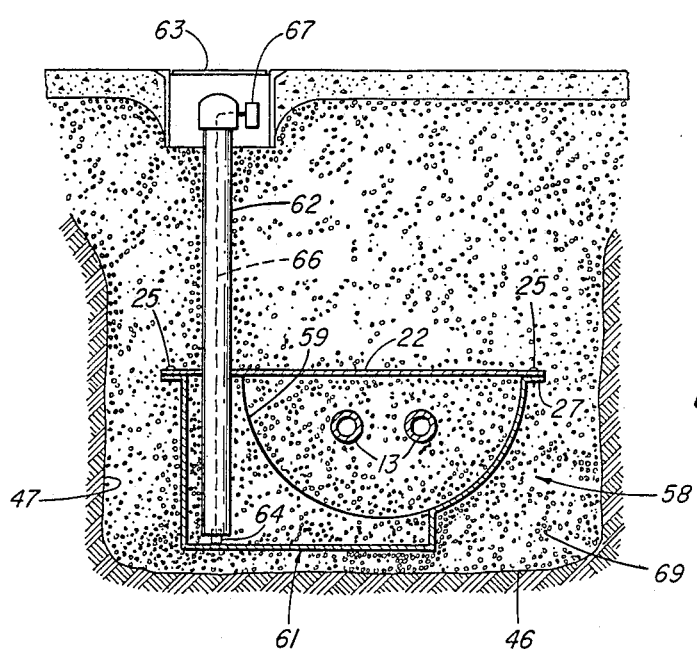
FIG. 3 is a transverse, cross-sectional view of a leak sensor housing, taken along the line 3—3 in FIG. 1.

Having completed the assembly of the containment shells 21, aggregate 69 is poured to a predetermined level, both within the shells and outside the shells. As shown in FIGS. 2 and 3, the aggregate outside the shells acts as backfill, filling the void between the shells and the trench walls and floor. The aggregate 69 within the shells, provides an elevated base within the containment system for supporting one or more fluid distribution pipes 13, in spaced relation from adjacent structures and components.

With the containment shells approximately 50 to 75% full of aggregate, the distribution pipes are laid out upon the aggregate base, and completely assembled. Then, further aggregate is poured to the level shown in FIG. 2, to cover the pipes and to provide backfill between the trench and the shells.

Returning now to FIG. 4, the notches 48 allow the respective abutting portions of adjacent flanges 27 to present a substantially even surface over which the upper cover 22 can lie. Adjacent mating surfaces are sealed together by means of a bead of sealant and compression screws 25. A strip of fiberglass material is sealed across joints between adjacent and abutting cover pieces 22 using an appropriate resin and hardener mixture. As is evident in FIG. 1, the joints between cover pieces are horizontally offset from joints between containment shells to ensure a stronger construction and to lessen the likelihood of fluid leaks from the containment system.

Entry points through the cover, such as the holes permitting passage of inspection tube 62 and fluid distribution pipe 13, are sealed to prevent the egress of fluid or the ingress of water existing in the surrounding soil. Similarly, a fluid impervious seal is provided between the end termination of a cover 22 and the correlating portion of extension sleeve 43. Thus, the secondary containment system 11 provides total containment for the enclosed fluid distribution pipes 13 and the associated fluid pumping and leak detection components. Following final assembly of the system, dirt or aggregate may be used to fill the trenches to grade level.

In the event that a leak does occur somewhere in the fluid distribution system, the fluid will pass downwardly through the aggregate 69 until it reaches the concave surface portion 24 of the containment shell 21. There, the fluid is directed downwardly, first toward the center, lowermost region of the shell and then along the center regions of the interconnected shells until it reaches a fluid collection trough 61. The transverse cross sectional configuration of the shells 21 ensures that the leaking fluid will be confined and directed toward the collection trough as quickly as possible so as to minimize the extent of the leak. Also, by confining the leaking fluid to the center regions of the containment shells, the amount of aggregate 69 which is contaminated by the fluid is reduced to a minimum. Therefore, after a leak has occurred and the containment system is opened for restoration, relatively little aggregate needs to be replaced or detoxified.

As shown in FIG. 1, leaks occurring in the long straight runs of the linear envelope units 23 will typically be first detected by the sensor adjacent the elbow envelope unit 29. However, fluid from a leaking pump or pipe within one of the pump housings 31 will usually actuate the sensor within the central pump housing.

It will be appreciated, then, that a total secondary containment system for conveyance and delivery systems transporting hazardous and toxic fluids has been provided.

What is claimed is:

1. A secondary containment system for a fluid pumping, distribution and dispensing station comprising: a fluid source, a fluid outlet, a fluid distribution pipe connecting said source and said outlet, a plurality of serially interconnected pipe envelope units enclosing said fluid distribution pipe, each of said envelope units including a rigid lower curvilinear-in-cross-section portion forming fluid-impervious joints with respective ends of adjacent said units and having upper edges adapted for fluid impervious engagement with a rigid upper cover portion, a pumping station envelope unit including a floor and a peripheral upstanding wall having an upper flange adapted for fluid-impervious engagement with a cover, said wall further including a curvilinear-in-cross-section outlet for passing said fluid distribution pipe and forming a fluid-impervious joint with an adjacent said pipe envelope unit.

2. A total secondary containment apparatus for a fluid distribution system, comprising:
   a. a fluid source;
   b. a fluid outlet;
   c. a fluid distribution pipe running from said fluid source to said fluid outlet;
   d. a plurality of pipe envelope units enclosing said fluid distribution pipe, said units being respectively interconnected by fluid impervious means and extending from said fluid inlet to said fluid outlet, each of said units including a rigid containment shell having an open top and an underlying concave surface portion, defined in cross section by a substantially continuous curve, and further including a rigid upper cover coextensive with said open top and attached to upper ends of said surface portion forming a fluid impervious seal therewith; and,
   e. sealing means adjacent said fluid source and said fluid outlet, for sealing said fluid distribution pipe as it enters and exits said plurality of interconnected pipe envelope units, thereby providing total containment for the enclosed run of said fluid distribution pipe.

3. An apparatus as in claim 2 in which said continuous curve is circular in configuration.

4. An apparatus as in claim 2 in which said continuous curve is elliptical in configuration.

5. An apparatus as in claim 2 further including aggregate within said shell, supporting and surrounding said fluid distribution pipe.

6. An apparatus as in claim 2 in which said pipe envelope units are inclined downwardly toward a lowermost one of said pipe envelope units and a fluid leak sensor in said lowermost pipe envelope unit.

7. A total secondary containment system for a fluid pumping, distribution, and dispensing station, comprising:
   a. a fluid pump;
   b. a fluid dispensing station;
   c. a fluid distribution pipe extending between the discharge of said pump and the inlet to said dispensing station;
   d. housing means for enclosing said pump, said housing means including an outlet for passage of said distribution pipe, said housing means including a floor and a peripheral upstanding wall having an upper flange adapted for sealing engagement with a cover, said outlet further being located in said wall and including an arcuate lip having an open top and a concave surface portion defined in transverse cross section by a substantially continuous curve;

e. a plurality of pipe envelope units, said units being respectively interconnected by fluid impervious joint means and extending from said outlet in said housing means to said dispensing station, each of said units including a rigid containment shell having an open top and a concave surface portion defined in transverse cross section by a substantially continuous curve, and further including a rigid upper cover coextensive with said open tops of said shells and said outlet and attached to upper ends of said surface portions and said arcuate lip forming a fluid impervious seal therewith.

8. A secondary containment system as in claim 7 including a fluid leak detector comprising a fluid collection trough interconnected with and having a portion lower than the bottom of the adjacent one of said pipe envelope units; and a fluid sensor disposed within said trough.

9. A secondary containment housing for a fluid pump interconnected to an outlet port of a storage tank, by means of a feed pipe, comprising:

a. a circular floor located between the pump and the tank, including an aperture therethrough for passage of the feed pipe, said floor including sealing means between said aperture and the feed pipe;

b. a peripheral, right-circular cylindrical wall upstanding from said floor, and extending at least above the pump;

c. outlet means in said wall for passage of a fluid distribution pipe connected to the pump's discharge port, said outlet means further being adapted for sealing engagement with a secondary containment system enclosing the portion of the distribution pipe outside said housing;

d. a housing cover, mounted over the upper end of said cylindrical wall, for sealing engagement therewith.

10. An apparatus as in claim 9 and further including a housing extension sleeve, said sleeve being right-circular cylindrical in configuration and having a diameter such that said sleeve slidably engages the inner side of said cylindrical wall to form a fluid impervious seal therewith, said cover being mounted upon the upper end of said sleeve for positioning said cover at a predetermined elevation above said cylindrical wall.

* * * * *